United States Patent
Levy et al.

(10) Patent No.: US 8,331,666 B2
(45) Date of Patent: Dec. 11, 2012

(54) AUTOMATIC RED EYE ARTIFACT REDUCTION FOR IMAGES

(75) Inventors: Noam Levy, Karmiel (IL); Meir Tzur, Haifa (IL)

(73) Assignee: CSR Technology Inc., San Jose, CA (US)

(*) Notice: Subject to any disclaimer, the term of this patent is extended or adjusted under 35 U.S.C. 154(b) by 963 days.

(21) Appl. No.: 12/391,173

(22) Filed: Feb. 23, 2009

(65) Prior Publication Data
US 2009/0220148 A1    Sep. 3, 2009

Related U.S. Application Data

(60) Provisional application No. 61/033,113, filed on Mar. 3, 2008.

(51) Int. Cl.
*G06K 9/00* (2006.01)

(52) U.S. Cl. ........................................ 382/167

(58) Field of Classification Search .......... 382/115–118, 382/162–165, 167, 190, 275; 348/222, 242, 348/576, 577; 396/158
See application file for complete search history.

(56) References Cited

U.S. PATENT DOCUMENTS

| | | | |
|---|---|---|---|
| 5,748,764 A * | 5/1998 | Benati et al. ................. | 382/117 |
| 6,252,976 B1 | 6/2001 | Schildkraut et al. | |
| 6,292,574 B1 | 9/2001 | Schildkraut et al. | |
| 6,407,777 B1 * | 6/2002 | DeLuca ........................ | 348/576 |
| 6,895,112 B2 | 5/2005 | Chen et al. | |
| 7,042,505 B1 | 5/2006 | DeLuca | |
| 7,116,820 B2 | 10/2006 | Luo et al. | |
| 7,155,058 B2 | 12/2006 | Gaubatz et al. | |
| 2003/0044177 A1 * | 3/2003 | Oberhardt et al. ............ | 396/158 |
| 2006/0017825 A1 * | 1/2006 | Thakur ........................ | 348/242 |
| 2007/0036438 A1 * | 2/2007 | Thakur ........................ | 382/190 |
| 2007/0252906 A1 | 11/2007 | Ulichney et al. | |

FOREIGN PATENT DOCUMENTS

| WO | WO 2005/114982 | 12/2005 |
|---|---|---|
| WO | WO 2006/045441 | 5/2006 |

OTHER PUBLICATIONS

D'Orazio T.; Cicirelli, L.G.; Distante, A.; An Algorithm for Real Time Eye Detection in Face Images; ICPR 2004.
Volken, F.; Terrier, J.; Vandewalle, P.; Automatic Red-Eye Removal Based on Sclera and Skin Tone Detection; CGIV 2006, pp. 359-364.
Gasparini, F. Schettini, R.; Automatic Redeye Removal for Smart Enhancement of Photos of Unknown Origin; Visual Information and Information Systems; Springer Berlin/Heidelberg, 2006.
Miao, X.; Sim, T.; Automatic Red-Eye Detection and Removal; ICME 2004.

(Continued)

*Primary Examiner* — Duy M Dang
(74) *Attorney, Agent, or Firm* — Frommer Lawrence & Haug LLP; John W. Branch

(57) ABSTRACT

Systems and methods are provided for reducing eye coloration artifacts in an image. In the system and method, an eye is detected in the image and a pupil color for the eye in the image and a skin color of skin in the image associated with the eye are determined. At least one region of artifact coloration in the eye in the image is then identified based on the pupil color and the skin color, and a coloration of the region is modified to compensate for the artifact coloration.

18 Claims, 7 Drawing Sheets

OTHER PUBLICATIONS

Corcoran P.; Bigio, P..; Steinberg, E.; Pososin, A.; Automated In-Camera Detection of Flash-Eye Defects; IEEE Transactions on Consumer Electronics 2005, vol. 51, No. 1, pp. 11-17.

Gaubatz, M.; Ulichney, R.; Automatic Red-Eye Detection and Correction; ICIP 2002.

Ulichney, R.; Gaubatz, M.; Perceptual-Based Correction of Photo Red-eye; SIP 2005.

Zhang, L.; Sun Y.; Li, M.; Hongjiang, Z.; Automated Red-Eye Detection and Correction in Digital Photographs; ICIP 2004.

Luo, H.; Yen, J.; Tretter, D.; An Efficient Automatic Redeye Detection and Correction Algorithm; ICPR 2004.

Safonov, I.; Automatic Red Eye Detection; GraphCon2007; Moscow, Russia.

* cited by examiner

100

200

300

400

400

450

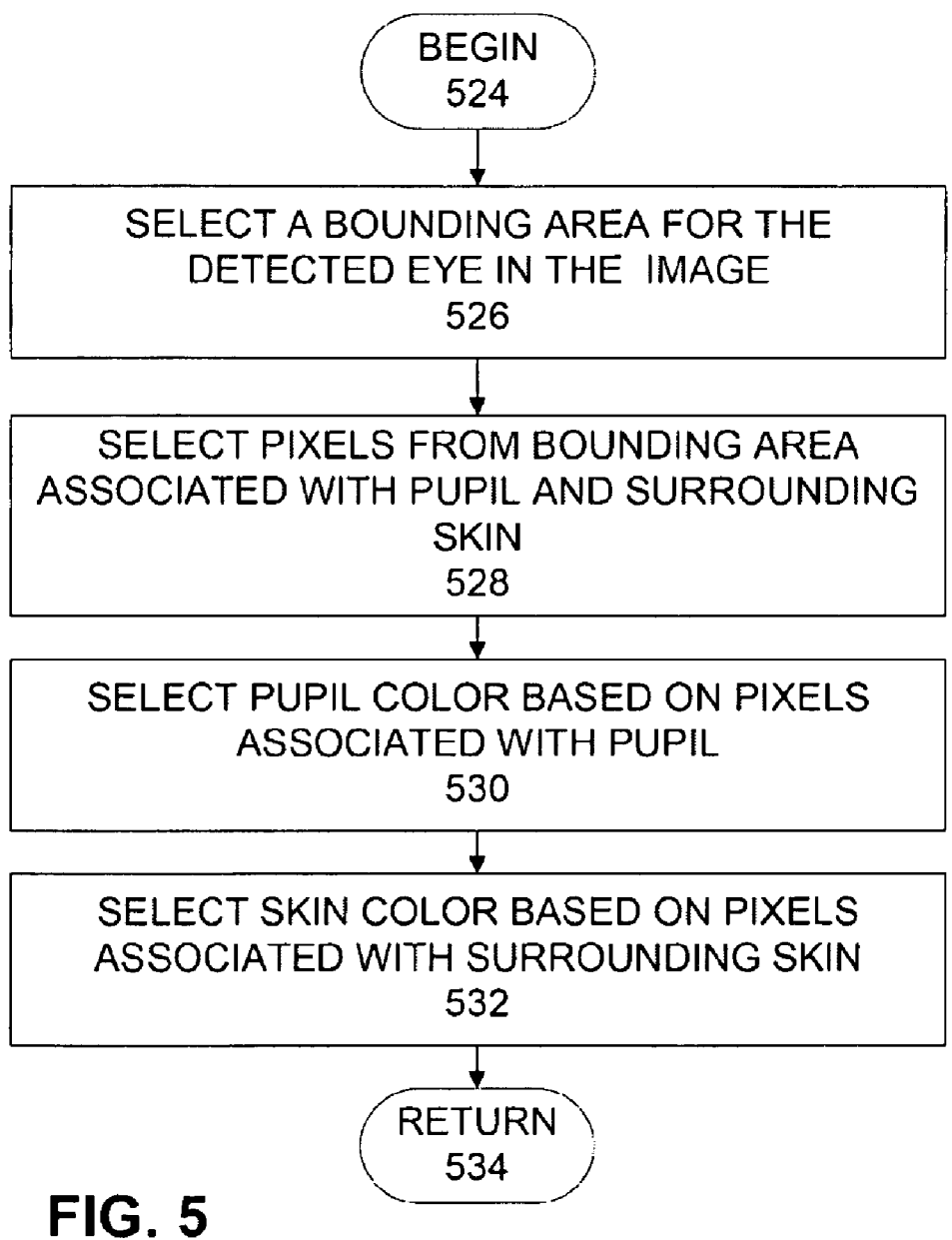

608

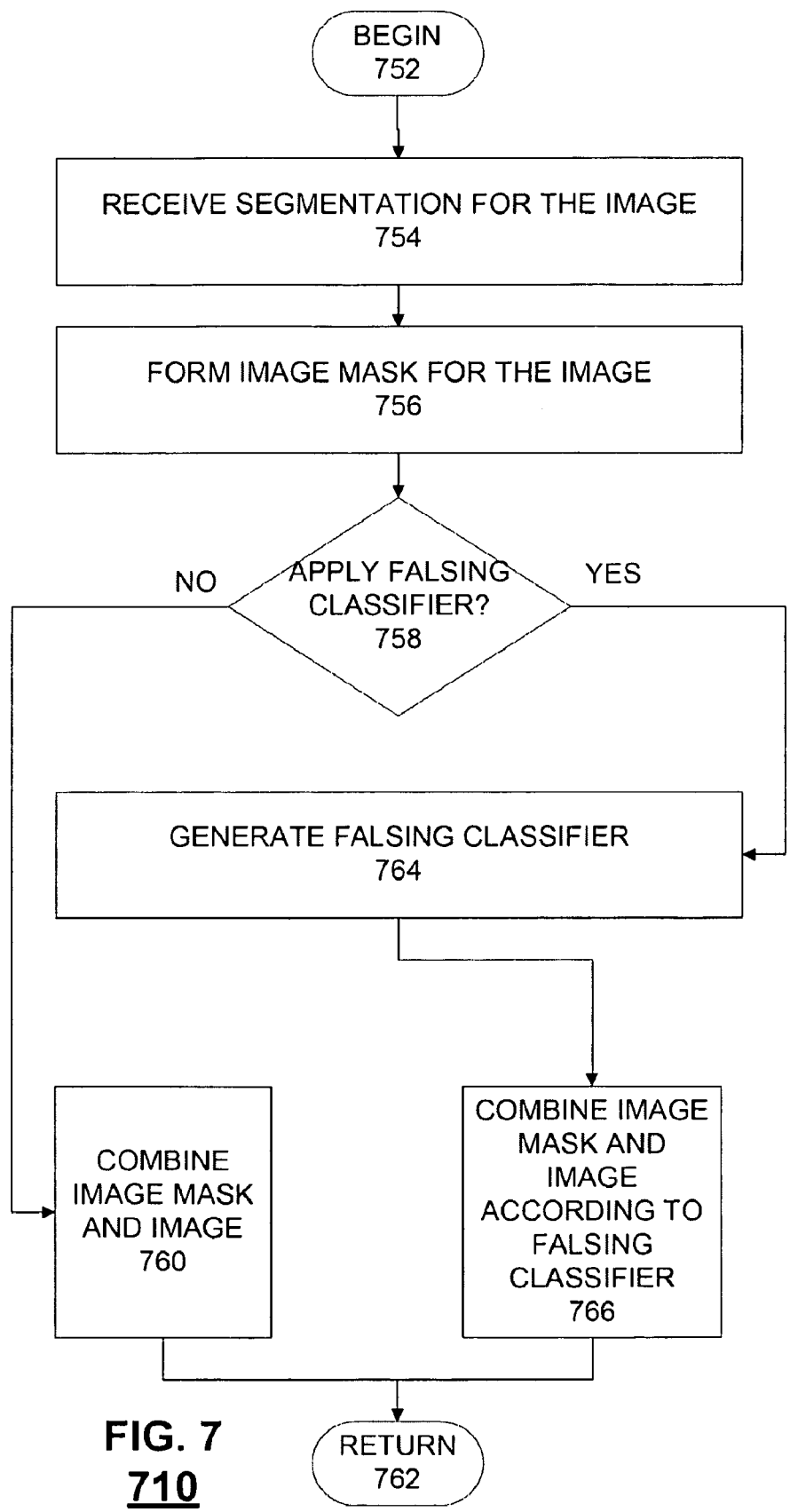

AUTOMATIC RED EYE ARTIFACT REDUCTION FOR IMAGES

CROSS-REFERENCE TO RELATED APPLICATIONS

This application is a utility patent application based on a previously filed U.S. Provisional Patent Application Ser. No. 61/033,113 filed on Mar. 3, 2008, the benefits of which are hereby claimed under 35 U.S.C. §119(e) and incorporated herein by reference.

FIELD

The invention relates generally to image enhancement and more particularly but not exclusively to systems and methods for the automatic reduction of coloration artifacts, such as red eye coloration in the images of eyes.

BACKGROUND

In general, conventional handheld digital cameras are equipped with an illumination device, such as a flash, for illuminating a scene during image capture. In some cases, the use of a flash results in false conversion of the eye color. For example, the use of a flash device can result in the appearance of red pupils (red-eye) or eyeshine (in many species other than human). Red-eye is typically observed when the flash light occurs too fast for the pupils to close. As a result, a large portion of the light from the flash passes into the eye through the pupil, reflects off the fundus at the back of the eyeball, and exits back out through the pupil before the end of image capture by the camera. The red color of the red-eye effect is due to the color of the fundus, caused by pigmentation in the subject being photographed.

Red-eye generally occurs under certain conditions. In particular, when the angle formed by the flash, the eye, and the lens is smaller than the angle formed by the flash, the back of the eye, and the edge of the pupil, the reflected light can reach the camera. This can occur when the flash is close to the lens, such as in a small handheld camera, and the camera is far enough from the subject. Therefore, as the dimensions of a flash-equipped cameras are reduced, as the proximity of lens and the flash in such cameras further reduces the angle formed by the flash, the eye, and the lens, increasing the chances of red-eye occurring.

There are two conventional approaches for solving the red-eye problem: prevention and correction. Prevention generally involves configuring a camera to fire at least one pre-flash to cause contraction of the pupil, which reduces the angle formed by the flash, the back of eye, and the edge of pupil. This can prevent reflected light from reaching the lens. Correction generally involves automatic or semi-automatic image processing system for modifying the color of the pupil to eliminate the undesired redness. In semi-automatic solutions, a user typically marks the location of the defective pupil color, and the image processing system performs the correction. In fully automatic correction solutions, the image processing system is configured to both detect and correct the undesired redness automatically using digital image processing techniques.

BRIEF DESCRIPTION OF THE DRAWINGS

Non-limiting and non-exhaustive embodiments of the invention are described with reference to the following drawings, in which:

FIG. 5 is a flow diagram of exemplary steps in a method for selecting pupil and skin color;

FIG. 7 is a flow diagram of a method for employing a classifier to prevent false correction of incorrectly identified eye coloration artifacts, in accordance with the invention.

DETAILED DESCRIPTION OF THE EMBODIMENTS

Figure 1:
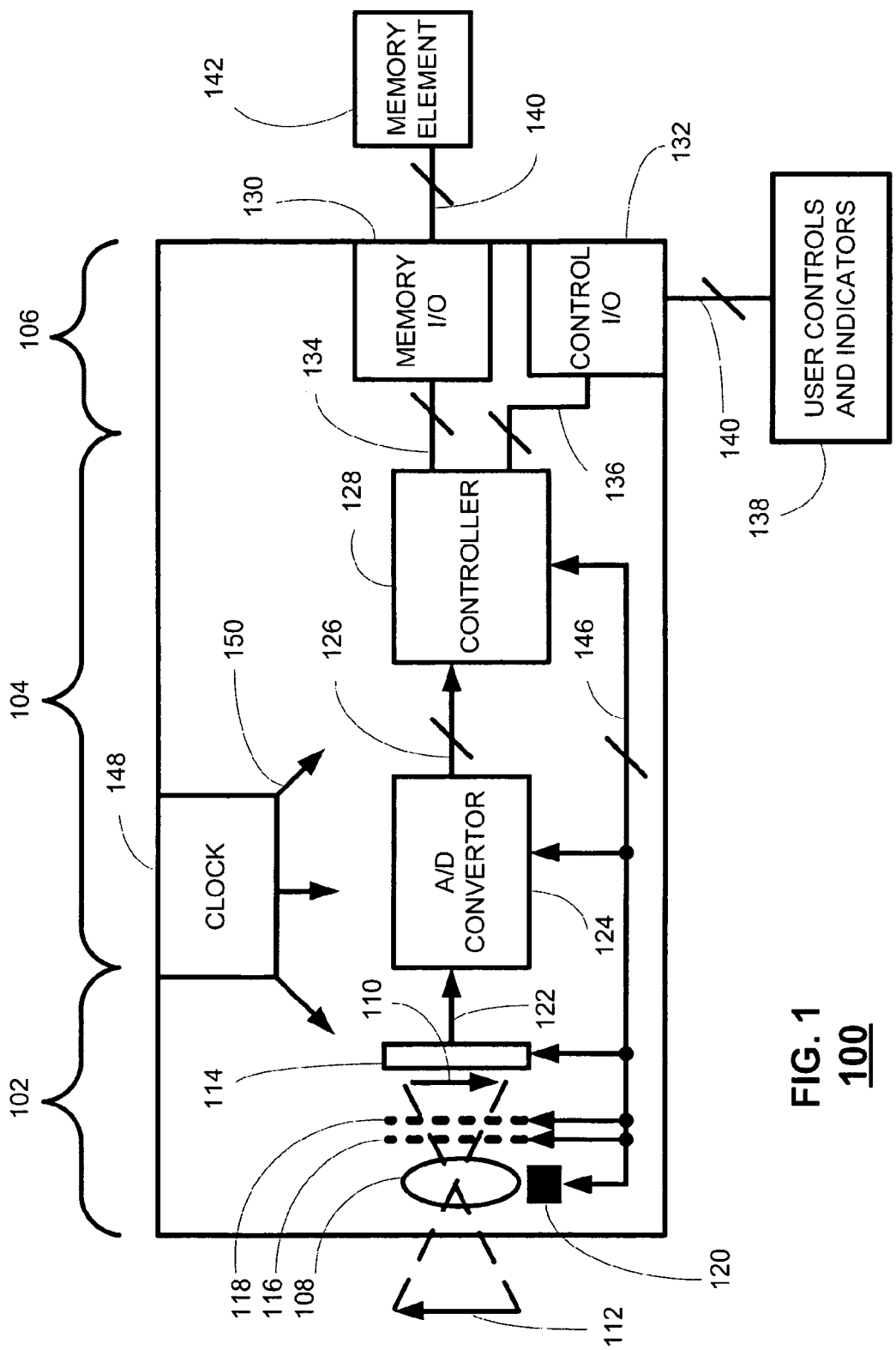
FIG. 1 shows a block diagram of an embodiment of an exemplary electronic imaging device operating environment for at least one embodiment of the invention.

The invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

The various embodiments of the invention provide systems and methods for reducing coloration artifacts in an image of eyes comprising a plurality of pixels having a plurality of color values. The eye image can be acquired using an electronic imaging device. Additionally, the term "electronic imaging device", as used herein, refers to any device or portion thereof adapted for at least generating digital images of a scene using a light-sensitive sensor. Such electronic imaging devices can include, but is not limited to, standalone digital still and/or video cameras and digital still and/or video cameras integrated with or connected to devices, systems, and/or communications networks. For example, electronic imaging devices can be integrated within or using computer systems and networks, mobile phones, personal digital assistants, pagers, security systems, and vehicles.

In the various embodiments of the invention, an eye is detected in the image and a pupil color for the eye in the image and a skin color of the skin in the image adjacent to the eye are determined. Based on the skin color and pupil color, at least one region of artifact coloration in the image of the eye is identified. The coloration of the pixels in the identified region of artifact coloration is then modified to reduce or eliminate the coloration caused by one or more artifacts.

Imaging Device Environment

FIG. 1 shows a schematic diagram of an electronic imaging device 100 for obtaining and processing composite still and/or video images according to an embodiment of the invention. Device 100 may include many more components than those shown. The components shown, however, are sufficient to disclose an illustrative embodiment for practicing the invention.

As shown in FIG. 1, device 100 can include an electronic optical system 102, an image processing system 104, and input/output (I/O) system 106. Optical system 102 can include lens 108, as shown in FIG. 1. However, in other embodiments of the invention, a set of lenses can be used. In operation, lens 108 forms image 110 of scene 112 on surface of image sensor 114. In general, light travels through aperture 116 and shutter 118 to reach sensor 114. Focus actuator 120 moves one or more elements of optical system 102 to focus image 110 on sensor 114. Electrical output 122 of sensor 114 carries one or more analog signals resulting from scanning individual photo-detectors of surface of sensor 114 onto which image 110 is projected. Sensor 114 typically contains a large number of individual photo-detectors arranged in a two-dimensional array of rows and columns to detect individual pixels of image 110. Signals proportional to intensity of light striking individual photo-detectors are obtained in output 122 to generate a frame of video data from which image 110 may be reconstructed.

Signals 122 generated by sensor 114 are processed using image processing system 104. First, analog signals 122 can be applied to an analog-to-digital (A/D) converter circuit 124 in image processing system 104 that generates digital data signals 126 representing image 110. Digital data signals 126 can then be processed by a processor or controller 128 in image processing system. Various functions of image processing system 104 can be implemented using one or more processing elements. These processing elements can be implemented in hardware, software, or any combination thereof. For example, in one embodiment of the invention, functions of controller 128 and A/D converter circuit 124 can be implemented in one or more integrated circuit chips. Furthermore, in some embodiments of the invention, A/D converter circuit can be incorporated into sensor 114.

Image processing system 104 is communicatively coupled to I/O system 106 to allow storage of captured and/or processed image data and to provide control signals for electronic imaging device 100. For example, as shown in FIG. 1, controller 128 is communicatively coupled to a memory input/output (I/O) interface 130 and control I/O interface 132 via connections 134 and 136, respectively. Control I/O interface 132 can be coupled to user controls or indicators 138 for exchanging control signals 140 for electronic imaging device 100. Image processing system 104 can also be implemented on one or more computing devices, internal or external to device 100, such as the image processing system described with regard to FIG. 2.

Memory I/O interface 130 can be coupled to a memory element 142 for exchanging data signals 144. Although a single external memory element 142 is shown in FIG. 1, the various embodiments of the invention are not limited in this regard. In some embodiments of the invention, controller 128 can be coupled to multiple internal and/or external memory elements. For example, controller 128 can be coupled or can include internal non-volatile memory elements for storing calibration data and the like and/or internal volatile memory elements for temporary data storage. External volatile and/or non-volatile memory elements can also be coupled to processor 128 for storing image data for transferring image data to other electronic imaging devices or image processing systems. Memory element 142 can include, but is not limited to, semiconductor-based memory devices, magnetic storage media devices, or optical storage media devices.

In addition to being coupled to interfaces 130 and 132, controller 128 can also be coupled to control and status lines 146. Lines 146 in turn, can be coupled to aperture 116, shutter 118, focus actuator 120, sensor 114, A/D converter 124, and other components of electronic imaging device 100 to provide synchronous operation. Signals in lines 146 from processor 128 drive focus actuator 120, set size of opening of aperture 116, operate shutter 118, and adjust a gain amount for analog signals 122 at A/D converter 124. A clock circuit 148 can be provided within electronic imaging device 100 for providing clock signals 150 to synchronize operation of the various components. Although shown in FIG. 1 as being generated by a separate component in electronic imaging system 100, the clock signal for system 100 can be generated within processor 128 or be provided by an external source.

Image Processing Environment

Figure 2:
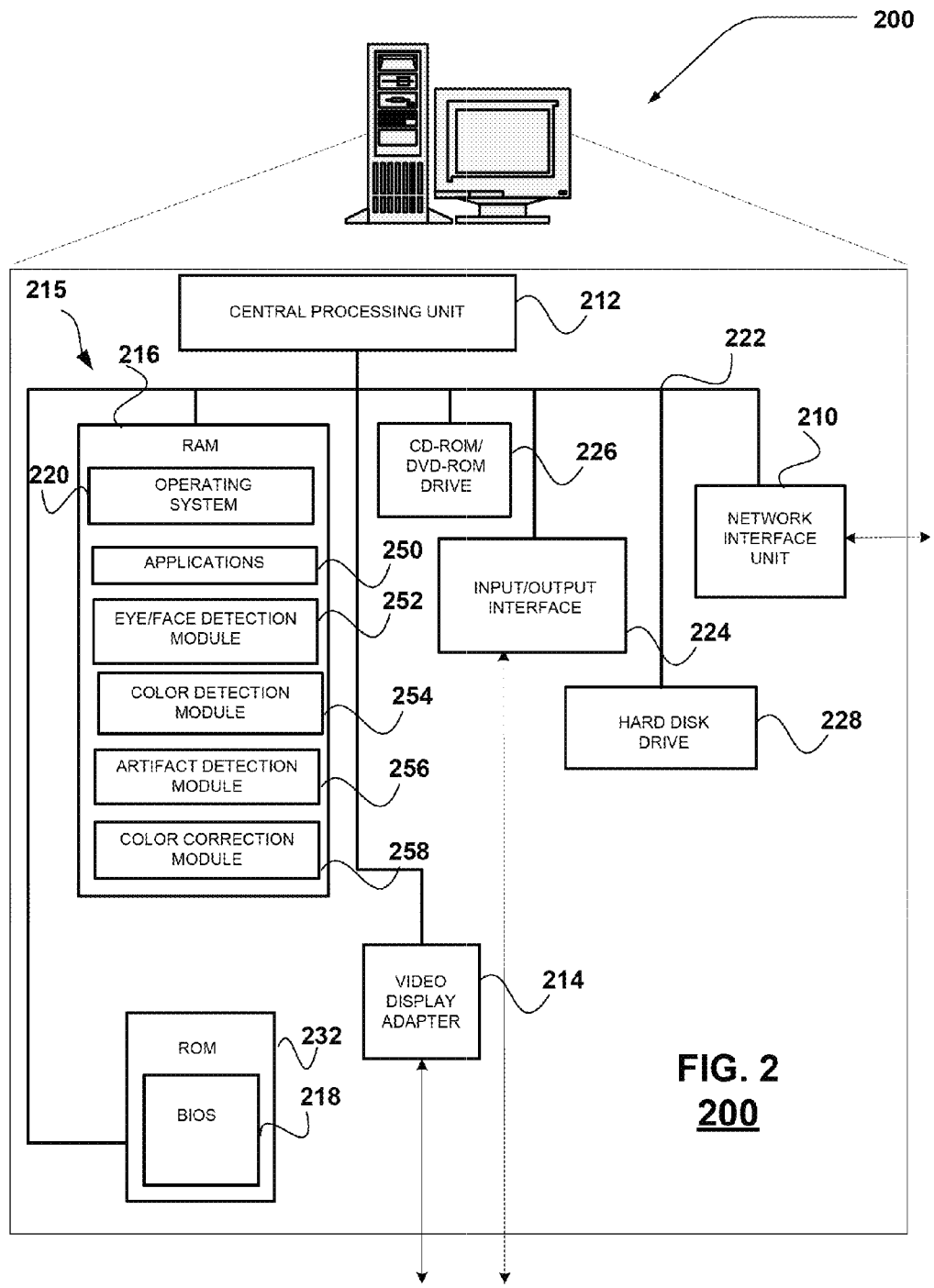
FIG. 2 shows a block diagram of an exemplary image processing system operating environment.

FIG. 2 shows one embodiment of an image processing system 200, according to one embodiment of the invention. System 200 may include many more components than those shown. The components shown, however, are sufficient to disclose an illustrative embodiment for practicing the invention.

System 200 includes processing unit 212, video display adapter 214, and a mass memory 215, all in communication with each other via bus 222. Mass memory 215 generally includes RAM 216, ROM 232, and one or more permanent mass storage devices, such as hard disk drive 228, tape drive, optical drive, and/or floppy disk drive. The mass memory stores operating system 220 for controlling the operation of system 200. Any general-purpose operating system may be employed. Basic input/output system ("BIOS") 218 is also provided for controlling the low-level operation of server 200. As illustrated in FIG. 2, server 200 also can communicate with the Internet, or some other communications network, via network interface unit 210, which is constructed for use with various communication protocols including the TCP/IP protocol. Network interface unit 210 is sometimes known as a transceiver, transceiving device, network interface card (NIC), and the like.

Mass memory 215 as described above illustrates a type of processor-readable storage media, which may include volatile, nonvolatile, removable, and non-removable media implemented in any method or technology for storage of information, such as processor readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device.

RAM 216 also stores program code and data. One or more applications 250 are loaded into RAM 216 and run on operating system 220. Examples of application programs include email programs, schedulers, calendars, web services, transcoders, database programs, word processing programs, spreadsheet programs, and so forth. RAM 216 may also include applications such as an eye/face detection module 252, which can be configured to implement face and/or eye detection algorithms or routines. Eye and face detection algorithms and methods will be described below in greater detail.

RAM 216 may further include modules that are useful for processing images including eye coloration artifacts, such as color detection module 254, artifact detection module 256, and color correction module 258. Color detection module 254 may include a database, text, folder, file, and the like, that is configured to maintain and store color information for one or more images, or portions thereof being processed. The color information can be entered by the user or obtained from other sources. The color information can also be extracted from the image, as described below. The color information, and modules to detect colors in an image, may be centralized or distributed over a number of resources.

Artifact detection module 256 can be included with the color detection module 254 or provided as a separate entity. Artifact detection module 256 may enable the user to identify and store the locations in an image of eye coloration artifacts, such as red-eye artifacts. However, artifact detection module 256 can also automatically detect such artifacts in images, as described below. The artifact location information, and modules to detect artifacts in an image, may be centralized or distributed over a number of resources.

Color correction module 258 can be included with artifact detection module 256 or provided as a separate entity. Color correction module 258 generally controls the correction of coloration of artifacts in images, as described below with respect to FIG. 6.

System 200 can also include input/output interface 224 for communicating with external devices, such as a mouse, keyboard, scanner, or other input devices not shown in FIG. 2. Likewise, system 200 can further include additional mass storage facilities such as CD-ROM/DVD-ROM drive 226 and hard disk drive 228. Hard disk drive 228 is utilized by system 200 to store, among other things, application programs, databases, eye/face detection module 252, color detection module 254, artifact detection module 256, color correction module 258, and the like.

As previously described, reduction of eye coloration artifacts such as red eye coloration is typically addressed by using preventive or corrective techniques. However conventional preventive techniques, such as pre-flashing for eliminating red-eye, may not eliminate all instances of eye coloration. As a result, many images captured using such preventive correction techniques may still require some level of post-capture red-eye image correction. Unfortunately, determining the proper amount of red-eye correction to provide pupil coloration approximating the color of the subject's pupils is generally non-trivial.

Some conventional solutions for automatically correcting red-eye are based on applying coloration based on a pre-defined values or assumptions about the amount of red-eye in the image and the color of facial skin. That is, based on some pre-defined amounts of coloration used to identify eye coloration, such as red-eye, similarly colored regions are identified and corrected. However, this type of approach can be problematic. First, the resulting amount of red-eye generally varies greatly between different images, different individuals, and even different eyes of the same individual. Therefore, one amount or range of red-eye coloration values may be insufficient to allow accurate automatic detection of red-eye coloration of eyes in an image. Second, the color of skin also suffers from great variability due to different white balance, illumination, ethnic origin of subject, physiological condition of subject at the instant of capture, and more. As a result, some amount of correction may be inadvertently applied to areas of the face having colors similar to the pre-defined red-eye color.

To overcome these limitations, the various embodiments of the invention provide new systems and methods for automatically reducing eye coloration artifacts, such as red-eye, as described above. In the various embodiments of the invention, eye location/detection techniques can be utilized to automatically select areas of an image associated with an eye. The selected areas of the image can then be sampled to estimate color values for the pupils and relatively adjacent facial features. The estimated color values can then be used to determine the amount of correction needed for pixels in the image.

Figure 3:
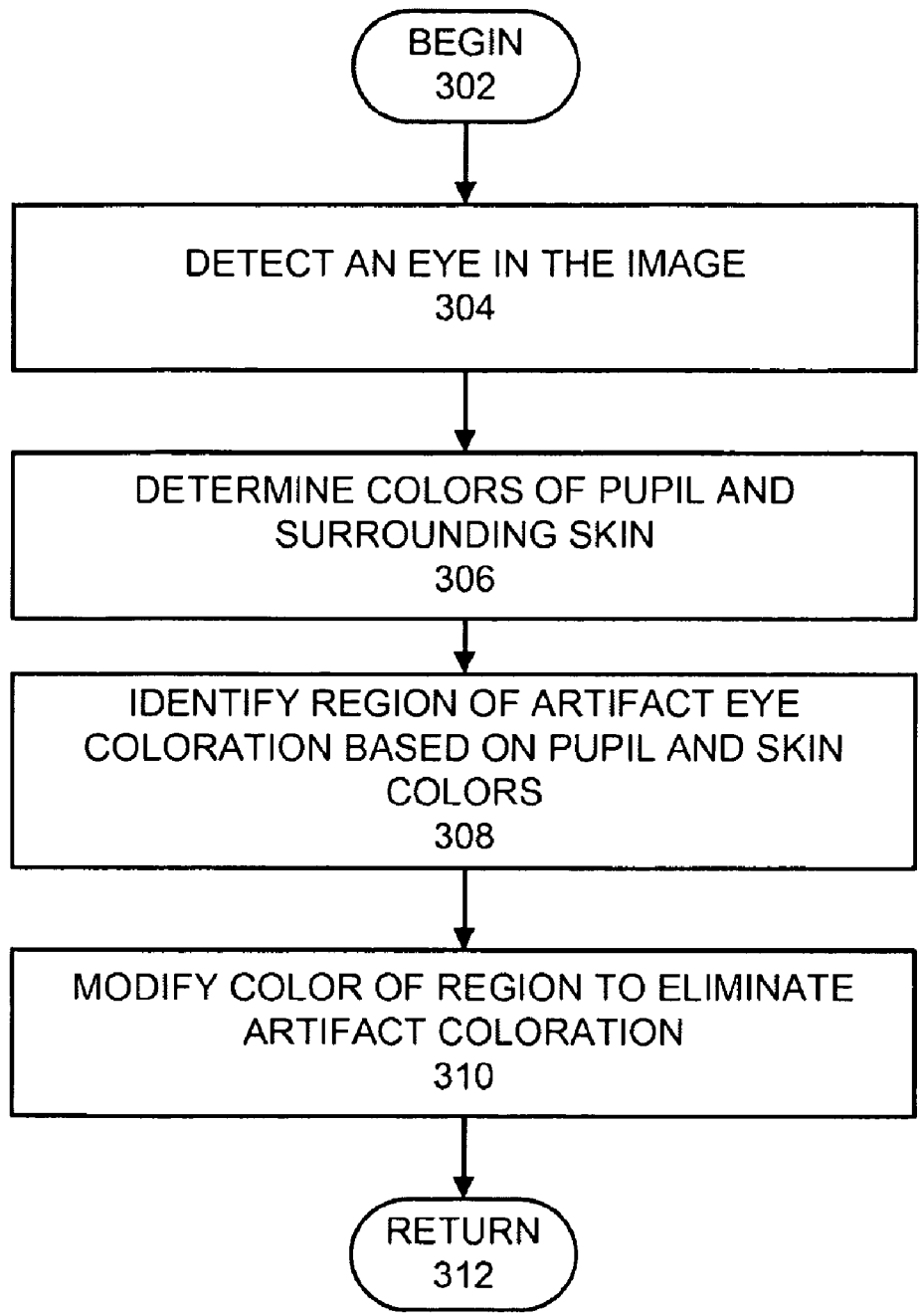
FIG. 3 is a flow diagram of exemplary steps in a method for providing eye coloration reduction, such as red-eye reduction, in accordance with an embodiment of the invention.

FIG. 3 is a flow diagram of steps in an exemplary method 300 for providing eye coloration reduction, such as red-eye reduction, in accordance with an embodiment of the invention. The method can begin at step 302 and can continue on to step 304. In step 304, an eye can be identified or detected in an image. Afterwards, in step 306, skin color and pupil color can be determined based on the location of detected eye. Using the skin and pupil colors, the region of the eye having undesired coloration can be identified in step 308. Subsequently in step 310, the color of the region of the eye with undesired coloration can be modified to reduce or eliminate undesired coloration, such as red-eye. The various steps in exemplary method 300 will be described below in greater detail with reference to FIGS. 4A, 4B, 4C, 5, and 6.

Figure 4A:
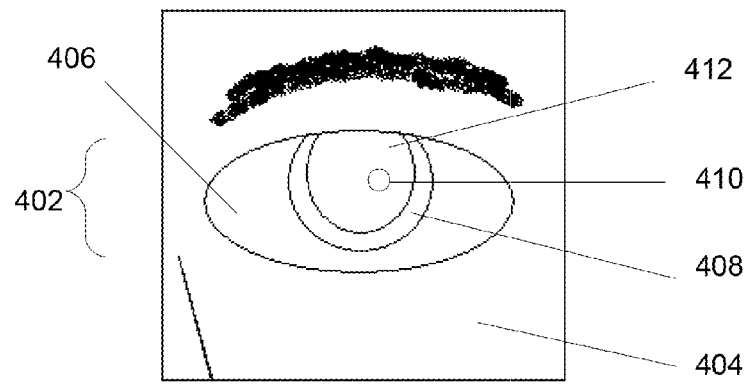
FIG. 4A is an exemplary image including an eye and relatively adjacent facial features centered approximately on the iris, selected from an image.

As described above, the method 300 begins with first detecting the location of an eye in an image in step 304. In general, eyes in an image can be located using various techniques dependent on known geometric and coloration properties of eyes. For example, the human eye, whether affected by eye coloration or not, has a distinct shape and coloration, as shown in FIG. 4A. FIG. 4A is exemplary image 400 including eye 402 and adjacent facial features 404 centered approximately on iris 408. Eye 402 is typically located within region 404 of skin color and generally has distinct oval shape with aspect ratio of about 4:1. Additionally, the white portion or sclera 406 usually is visible with distinct color. In general, the 408 has a round shape, the borders of which are always at least partly visible. Pupil 412 within iris 408 is also generally visible and has a round shape with borders visible. In non-red eyes, pupil 408 is typically dark (almost black). In red eyes, pupil 408 is usually red in varying degrees. These common characteristics can be used to facilitate automatic eye detection processes.

For example, in some embodiments of the invention, a template match method, performed by a correlation, can be utilized for eye detection, as described in greater detail below. In other embodiments of the invention, other automatic detection methods can be used. However, embodiments of the invention are not limited solely to automatic detection methods. In some embodiments of the invention, the locations of eyes of the subjects can be manually selected, such as in conventional semi-automatic red-eye reduction methods. In some embodiments of the invention, the eye detection process can include or can be preceded by a face detection process to facilitate the eye detection process. Like the eye detection process, the face detection process can be implemented using an algorithm to automatically detect faces in an image or can be performed manually by a user.

In some embodiments of the invention, the eye detection method used can be configured to detect only eyes suspected of having some amount of eye coloration. For example, as described in greater detail below, a color space transformation can be used to enhance the appearance of eyes demonstrating red-eye artifacts and the eye detection algorithm can be configured to analyze the transformed image to locate such eyes.

As described above, after detecting the location of an eye in an image in step 304, method 300 continues on step 306 to determine the colors of the pupil and relatively adjacent skin for the detected eye. In general, these pupil and skin colors are determined based on sampling of pixels associated with the eye. That is, by sampling the pixels associated with the pupil of the eye and relatively adjacent skin or other facial features.

An exemplary method 506 of determining skin and pupil colors is shown in FIG. 5. The method in FIG. 5 begins with step 524 and continues on to step 526. In step 526, a bounding area is selected. The bounding area can be formed from pixels from an area of the image including at least a portion of the selected eye and relatively adjacent facial areas. In general, the size of the bounding area can be selected to correspond to the typical dimensions of the eye. That is, the width of the bounding area can be generally on the order of the typical width of the eye and do not need to exactly match the actual dimensions of the eye in the image.

In some embodiments, the dimensions of bounding area can be calculated from the dimensions of a detected face in the image. For example, in some embodiments, the width of the bounding area can be 0.2×width of detected face. In such embodiments, a face detection method would be implemented that calculates the face dimensions in the image along with face location. However, any other method of providing bounding area dimensions can be used with the various embodiments of the invention. For example, bounding area dimensions can be obtained from estimation of the locations and dimensions of sclera portions in the eye.

Once the bounding area is selected in step 526, pixels in the bounding area can be selected or sampled in step 528. These sampled pixels can then be used to determine the colors of the pupil and the relatively adjacent skin. Although feature detection algorithms can be used in some embodiments of the invention to select pixels associated with the pupil and relatively adjacent skin and other facial features, in other embodiments of the invention, selection of the bounding area can be used facilitate selection of pixels for sampling. For example, the bounding area of the image can be selected such that the iris and/or pupil are located approximately at the center, such as in image 400 shown in FIG. 4A. Accordingly, pixels at or near the center of such a bounding area are likely pixels associated with the pupil. Similarly, pixels at or near the periphery of such a bounding area are likely pixels associated with skin that is relatively adjacent to the eye.

Figure 4B:
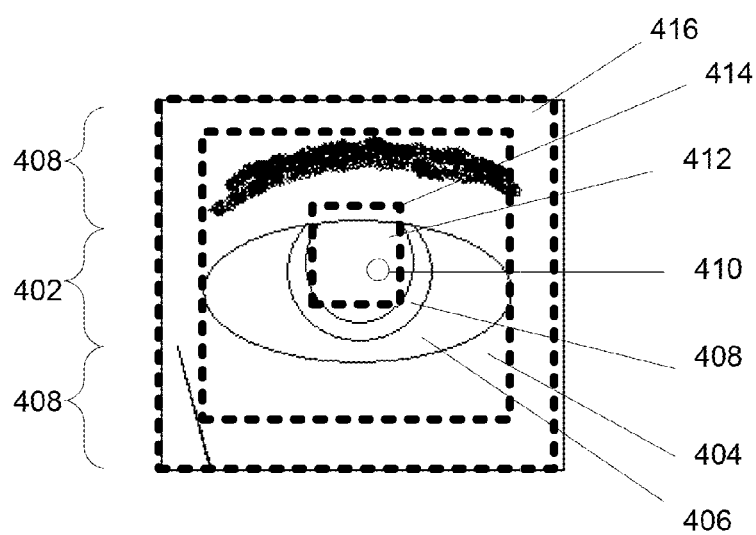
FIG. 4B is the exemplary image in FIG. 3A with central and peripheral areas identified.

In embodiments of the invention using a bounding area centered on the pupil or iris, a central area and at least one peripheral area of the bounding area of the image can then be selected for sampling purposes. This is conceptually illustrated in FIG. 4B. FIG. 4B is the exemplary image 400 in FIG. 4A with central 414 and peripheral 416 areas identified. This effectively results in selection of pixels of image 400 associated with skin coloration (i.e., the pixels in peripheral areas 416) and pixels of image 400 principally associated with eye coloration (i.e., the pixels in central area 414). In general, the dimensions of the central area can be selected to correspond to the typical dimensions of an iris or a pupil. As described above for bounding area dimensions, dimensions of the central area can also be based estimating pupil or iris dimensions from face dimensions or estimated eye width from the image. However, any other methods for estimating iris or pupil dimensions are equally suitable. Accordingly, in the various embodiments of the invention, central area 414 can have dimensions smaller or larger than the actual dimensions of iris 408 and/or pupil 412 in the image 400. As a result, central area 414 can include portions of facial areas 404 or sclera 406.

The dimensions of peripheral area 416 can be selected such that only portions including skin or other facial features are selected. Although FIG. 4B shows that peripheral area 416 extends around the entire periphery of image 400, the invention is not limited in this regard. In some embodiments of the invention, peripheral area 416 can comprise one or more separate areas around the periphery of image 400. For example, as described above, the typical human eye has an aspect ratio of 2:1. As a result, if the aspect ratio of image 400 is different, such as 1:1 (a square), as shown in FIGS. 4A and 4B, the peripheral areas can be selected to be in areas at top 418 and bottom 420 of the image 400. This selection is likely to include primarily relatively adjacent skin, since such areas are less likely to contain one or more portions of eye 402. However, the various embodiments of the invention are not limited to using a bounding area having a square shape.

Referring back to FIG. 5, once the pixels associated with the pupil and skin are selected in step 528, the pupil color can be determined in step 530 and the skin color can be determined in step 532 using the pixels associated with the pupil and skin, respectively. For example, referring to FIG. 4B, by sampling the pixels in areas 414 and 416, the color values for the pupil and/or iris and the skin and other facial regions can be determined in the case of pixel selection as shown in FIG. 4B, the assumption is made that the color values associated with the pixels in peripheral areas 416 accurately reflect the color values of skin colored pixels in the bounding area outside the eye. Accordingly, a mean, a median, and/or a distribution of the color values for these facial features can be estimated. Similarly, the assumption is made that the color values of the pixels in central area 414 accurately reflect the present color values for pixels in the iris and/or the pupil. Accordingly, a mean, a median, and/or a distribution of the color values the pupil and/or iris can also be estimated.

Although, there are other areas of colors near the pupil, such as sclera and iris, they are generally easy to differentiate from the color of the pupil in the image. In particular, these area are generally of a fundamentally different color as compared to the skin and the pupil showing red-eye effects. For example, the sclera is typically white, while the iris is generally brown, blue, or green.

As described above, the dimensions of central area 414 can result in the inclusion of pixels that are not associated with iris and/or the pupil. Such a result is also shown in FIG. 4B. In such cases, several methods can be utilized for excluding such pixels to ensure that the estimated color values are only the areas of the pupil and/or the iris. For example, if any of the color values for the pixels in central area 414 are within a distribution of the color values for the pixels in peripheral areas 416, these pixels can be ignored or removed for purposes of estimating color values for the central area. In another example, the distribution of color values in central area 414 can be analyzed. If central area 414 includes a significant number of pixels outside the iris and/or the pupil, the color values for such pixels will cause the distribution of color values to appear as two or more overlapping distributions, where the color values associated with the pupil and/or iris form a primary distribution and the color values associated with other facial features form a secondary distribution. As a result, these color values associated with the secondary distribution can be removed prior to estimating color values for the central area 414.

Figure 6:
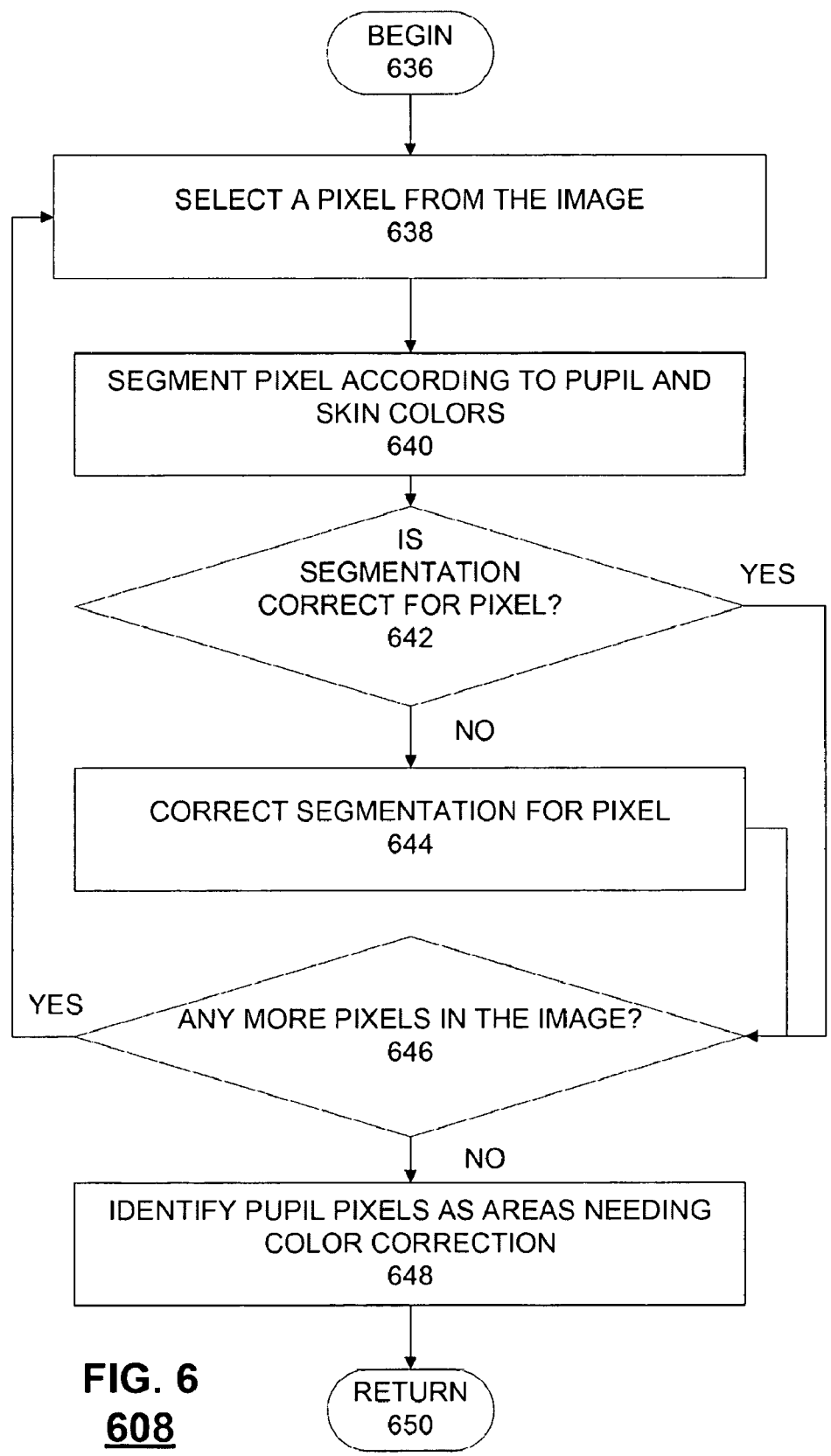
FIG. 6 is a flow diagram of exemplary steps in a method for identifying regions associated with eye coloration artifacts.

As described above, after colors of the pupil and relatively adjacent skin are determined in step 306, method 300 continues on step 308 to identify a region including an eye coloration artifact based on the pupil and skin colors. FIG. 6 provides an exemplary method 608 for identifying such regions in accordance with an embodiment of the invention. In particular, method 608 provides identification of regions by analyzing the color of each pixel in the image to determine whether the pixel is associated with the pupil or another region of a face. Although method 608 can be performed over the entire image, segmentation can be performed over only a portion of the image, such as a bounding area, to reduce computational intensity.

Method 608 begins with step 636 and continues on to step 638. In step 638, a pixel from the image is selected. Afterwards, in step 640, the selected pixel can be segmented or classified according to the previously determined pupil and skin colors. In a segmentation procedure, if the color value of the pixel is closer to the estimated color value for the pupil, the pixel is classified as being in a pupil region. In contrast, if the color value of the pixel is closer to the estimated color value for the relatively adjacent facial features, the pixel is classified in the segmentation procedure as being in a non-pupil region.

In the various embodiments of the invention, various types of segmentation procedures can be used. For example, the segmentation can be performed by a simple comparison of the color values of the pixels in the image to the estimated color values for the central and peripheral areas. In another example, the segmentation procedure can be based on a linear classifier in a ($R_1$,G) color space to distinguish between the pupil pixels and non-pupil, where $R_1$=R−1.5·G. The blue color value (B) is generally not required since the information contained in the blue color value is redundant for the pupil segmentation process. That is, a linear classifier in a ($R_1$,G,B) color space generally makes the same decisions than a linear classifier in the ($R_1$,G) color space. In the various embodiments of the invention, this type of linear classification can be based on calculating a covariance matrix for the central area and takes the form of:

$$a \cdot R_1 + b \cdot G + c \overset{pupil}{\underset{BG}{\gtrless}} 0 \quad (1)$$

wherein a, b, and c are parameters evaluated from the mean and covariance matrix of the pixels in the central area. The linear classifier in equation (1) is supplemented by a second classifier based only on the $R_1$ value in the form of:

$$R_1 \overset{pupil}{\underset{BG}{\gtrless}} \theta \quad (2)$$

where θ is a threshold values. The linear classifiers are combined by a logical 'AND' for deciding whether a pixel is classified as pupil or non-pupil. That is, a pixel is a pupil pixel if both equation (1) and (2) evaluate to 'pupil'. In general, the second classifier increases the stability of the algorithm for border cases and does not eliminate a significant amount of pixels which the first classifier passed.

In general, the difference between color values of the pixels in the relatively adjacent facial features and pixels in the pupil and/or iris will be sufficiently large to result in few or no misclassified pixels. However, in some individuals, certain areas of the relatively adjacent facial regions can have coloration similar to that in the pupil and/or iris, resulting in misclassification of pixels in these facial regions. Accordingly, in some embodiments of the invention, reclassification can be provided after segmentation. That is, the classification of the pixels can be subsequently adjusted. For example, as shown in FIG. 6, after the segmentation in step 640, the pixel can be evaluated in step 642 to see if a correct classification for the pixel has been provided. For example, if it is determined that a pixel segmented into the pupil pixel type is not located in an area of the image associated with a location of a pupil and/or an iris, it can be determined that reclassification to non-pupil is required.

Determination of such areas can be performed in several ways. For example, eye detection algorithms can be configured to not only to determine the general location of the eyes in a face, but also to determine the locations of the sclera, the iris, and the pupil with a high degree of accuracy, as described below. This location information can then be used to determine if pixels have been misclassified.

If the pixel is found at step 642 to have an incorrect segmentation, the segmentation is corrected in step 644. Afterwards, method 608 can check to see if any other pixels need to be segmented in step 646. If other pixels exist, steps 638-646 can be repeated until all pixels in the image, or portion thereof, are segmented. Afterwards, in step 648, the areas associated with pupil pixels can be identified as the regions including eye coloration artifacts needing correction. The method 608 can then return to previous processing at step 650.

Figure 4C:
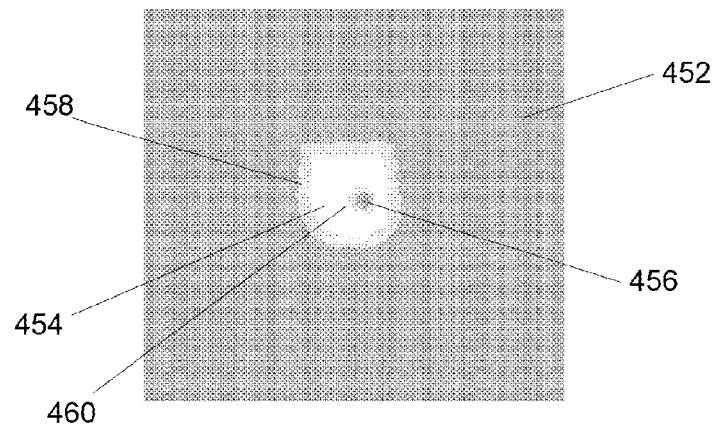
FIG. 4C is an exemplary image mask for the image in FIG. 3A.

Once the areas of eye coloration artifacts have been identified in step 306, the coloration in these areas can be modified to remove or eliminate the undesirable coloration in step 310. In general, exemplary method 300 performs step 310 by using the identification in 306 to form an image mask, such as a pupil segmentation mask, for applying color correction to the pixels in the image. An exemplary image mask 450 for image 400 is shown in FIG. 4C.

As described above, eye coloration artifacts are generally limited to the pupil and/or the iris. Accordingly, relatively adjacent facial features 404 and sclera 406 in FIG. 4A would typically receive little or no amount of correction while pupil 412 and/or iris 408 would receive varying amounts of color correction. As a result, image mask 450 in FIG. 4C can be configured to specify values of little or no color correction (shown as darker shaded regions in FIG. 4C) for areas 452 associated with facial features 404 and sclera 406 in FIG. 4A. In contrast, image mask 450 in FIG. 4C can specify a large value correction (shown as white) for areas 454 associated with pupil 412 and/or iris 408 in FIG. 4A. The areas needing correction can be selected according to various methods. For example, in some embodiments, the areas for the image mask can be based on the segmentation procedure described above with respect to FIG. 6.

In some photographs taken with a flash, additional artifacts can appear that affect the image mask 450 in FIG. 4B. For example, as shown in FIG. 4A, white glint 410 of the flash reflection off the outer surface of eye 402 can appear in an image, usually inside pupil 412 or nearby. As a result, values for area 456 of image mask 450 associated with glint 410 in FIG. 4A would also be selected to provide little or no correction and thus preserving the white color of glint 410.

In the various embodiments of the invention, eye coloration correction can be performed by blending a modified image with the original image. For example, in the case of red-eye correction, the image mask described above with respect to FIG. 4C can be combined with the image in FIG. 4A to provide a corrected image $P_{corrected}$. This combination can be expressed as $$P_{corrected} = \alpha \cdot P_{original} + (1-\alpha) \cdot P_{modified} \quad (3)$$

where $P_{original}$ is the image, $\alpha$ is the image mask associated with the image, and $P_{modified}$ is the pixel value in which the color artifact has been removed. $P_{modified}$ can be expressed as:

$$P_{modified} = f(Y') \cdot (Y'(G,B), G, B) + (1-f(Y')) \cdot (R_{ref}, G_{ref}, B_{ref}) \quad (4)$$

where Y'=0.84·G+0.16·B and G and B are the actual green and blue color values in red-green-blue (RGB) color space for a pixel in an image. The estimation for the red color value (Y') provides a linear estimation that, if the original color values were de-saturated, then Y'=R, the actual red color value in RGB color space for pixel. This generally desaturates the pixels in the image that are principally red, but performs only a minor adjustment for pixels which are not red. f(Y') is a suppression factor for providing equal correction to both red eyes and semi-red eyes which are partially washed out. This generally solves a common problem with many red eye reduction algorithms, which do not handle this phenomenon well. $(R_{ref}, G_{ref}, B_{ref})$ is a reference color used to replace color values for pixels in the image being suppressed by the suppression factor. The reference color is given by:

$$(R_{ref}, G_{ref}, B_{ref}) = (1, p_G, p_B) \cdot \frac{Y'_{ref}}{K} \quad (5)$$

Where $Y'_{ref}$ is the average Y' value in the central area of the detected face, typically an area comprising 50 to 75% of the central area of the detected face. In general, low values of Y' are reliable since they express most red-eye conditions which can be corrected by simply replacing the red channel. High values of Y' are also generally reliable since they are the glint. Values of Y' in between are the typical Y' value for washed-out red eyes and can require some suppression. In this way, the brightness of the reference color can be selected to be is proportional to the average brightness of the face. In equation (5), $p_G$ and $p_B$ determine the hue of the reference color and are generally chosen empirically. For example, values between 0.5 and 1, such as 0.8 and 0.7 for $p_G$ and $P_B$, respectively, can be selected to give the reference color a slightly reddish tint, simulating the natural appearance of a dilated pupil. K is a parameter that denotes how much darker the eye should be than the face and can also be chosen empirically. For example, K can have values between 3 and 5, such as 3.5.

Although color correction can be applied uniformly simply based on the identification regions of coloration artifacts, in some embodiments, a relative amount of color correction can be applied to each pixel in the image to reduce the appearance of hard edges in the image during subsequent combining of the image and the image mask. For example, smoothing or blurring can be applied to the image mask. This is also conceptually illustrated in FIG. 4C. As shown in FIG. 4C, transition region 458 can be generated by smoothing or blurring of the boundary between areas 452 and 454. Similarly, transition region 460 can also be formed between areas 454 and 456. These transition regions can be formed using any conventional smoothing or blurring methods. After the smoothing and/or blurring are completed, the image mask 450 can be applied to the original image 400 to provide the color correction.

As previously described above with respect to FIG. 5, the segmentation of pixels can be verified during the segmentation process. However, in some embodiments of the invention, the segmentation can also be verified after the image mask is formed, but before any changes are made to the image. For example, FIG. 7 provides an exemplary method 710 for modifying an image in accordance with an embodiment of the invention. The method 710 begins with step 752 and continues on to step 754, where the segmentation information for the image is received. In one embodiment, the segmentation information can be generated in accordance with the method described in FIG. 6. Afterwards, at step 756, the image mask can be formed, as described. At step 758, it can be determined if falsing classification (i.e., verification of the segmentation) should be performed. If no falsing classification is to be performed, the method 710 can proceed to step 760 to combine the image mask and the image to form the final image as described above and the method can resume previous processing at step 762.

If falsing classification is to be performed, method 710 can proceed to step 764 and the falsing classifier is generated. The falsing classifier can be used to verify that segmentation is correct, based on the image information and any segmenting and/or the image mask. In general, a falsing classifier approach analyzes some basic scalar features that distinguish between the appearance of a correctly located and segmented red eye and the appearance of other facial regions and determines whether the segmenting was properly performed. In one embodiment, falsing classification for the image is performed on a pupil-by-pupil basis.

One suitable falsing classifier is an adaptive boosting (AdaBoost) algorithm, which is a machine learning meta-algorithm and can be used in conjunction with many other learning algorithms to improve their performance. AdaBoost algorithms are adaptive in the sense that subsequent classifiers built by the algorithm are tweaked in favor of those instances misclassified by previous classifiers. AdaBoost algorithms are generally sensitive to noisy data and outliers. Otherwise, it is less susceptible to the overfitting problem than most learning algorithms. In the process of training, an AdaBoost algorithm calls a weak classifier repeatedly. For each call a distribution of weights is updated that indicates the importance of data points in the data set being classified. On each round, the weights of each incorrectly classified data points are increased (or alternatively, the weights of each correctly classified data points are decreased), so that the new classifier focuses more on those data points. An exemplary use of an Adaboost algorithm for processing image data is described by R. O. Duda, et al., *Pattern Classification*, pg. 478, $2^{nd}$ edition, 2001. An exemplary set of weak classifiers for falsing classifier based on an AdaBoost algorithm is shown Table 1.

TABLE 1

Weak Classifiers for AdaBoost-based Falsing Classifier

| Weak Classifier | Feature Associated with Weak Classifier |
|---|---|
| 1 | Color variation between segmented region and background region.<br>$f_1 = |G_s - G_{bg}| + 2*|R_s - R_{bg}|$<br>Where $G_s$, $G_{bg}$, $R_s$, $R_{bg}$ are the median value of G and R1 in the segmented and |

TABLE 1-continued

Weak Classifiers for AdaBoost-based Falsing Classifier

| Weak Classifier | Feature Associated with Weak Classifier |
|---|---|
| | background area, respectively. |
| 2 | Roundness measure:<br>$f_2 = (2048*(\text{Area of mask}))/(\text{Area of bounding circle})$<br>Where the "bounding circle" is the circle of minimum radius that is centered at the segmented region's center of mass and contains the entire region. The "center of mass" defines an x-coordinate that is the average x-coordinate of pixels for which the image mask is non-zero and a y-coordinate that is the average y-coordinate of pixels for which the image mask is non-zero. |
| 3 | Relative redness measure:<br>$f_3 = 4096*R_s/\sigma(32*R1)$<br>Where $R_s$ is the maximum R1 value in the segmented region, and $\sigma(32*R1)$ is the standard deviation of $32*R1$ in the entire eye image. |
| 4 | Difference in texture between segmented region and background region.<br>$F_4 = \sigma(256*G_s) - \sigma(256*G_{bg})$<br>Where the "background region" is an area in the eye region of interest which is not related to the pupil. |
| 5 | Redness variation in center region.<br>$f_5 = \sigma(256*R_{center})$<br>$R_{center}$ is all the R1 values in a square in the center of the eye image covering 25% of the area. |
| 6 | Difference between width of mask and expected width of mask.<br>$F_6 = |W_m - W_e|$ |
| 7 | % of pixels remaining in mask after morphological closing and connected components:<br>$F_7 = 256*(\text{Number of pixels in mask after ops})/(\text{Number of pixels before})$ |
| 8 | Distance of mask center of mass from the center of the pupil, relative to the mask size.<br>$F_8 = ((COM_x - C_x)^2 + (COM_y - C_y)^2)/(S_x^2 + S_y^2)$<br>Where Cx, Cy are the detected coordinates of pupil from the eye detection stage. COMx, COMy are the image mask's center of mass coordinates, and Sx, Sy are the width and height, respectively of the segmentation mask. |
| 9 | Difference between height of the image mask ($H_m$) and expected height of image mask ($H_e$).<br>$F_9 = |H_m - H_e|$ |
| 10 | Average whiteness value in the central region, excluding segmented region.<br>$F_{10} = <WNS_{center\backslash s}>$ |

Although ten weak classifiers are shown above, the embodiments of the invention are not limited in this regard and any number and types of weak classifiers can be used. Additionally, although a falsing classifier analysis can be applied to an entire image, the analysis can also be performed only on pixels in the facial areas to reduce computational intensity. In many instances, the full image need not be analyzed since improper corrections in these areas are typically more obvious that those in other regions.

After the falsing classifier is generated at step 764, the image mask and the image are combined at step 766 based on the result of the falsing classifier. For example, if segmentation is incorrect for a pixel in a facial area and the image mask specifies that the pixel should be modified, the pixel is not modified in the final image. Once the image is generated at step 766, the method can resume previous processing at step 762.

Eye Detection Algorithms

In some embodiments of the invention, the process of locating eyes in an image can be performed by conversion of the image to an artificial color space, as described above. For example, one suitable color space conversion is defined by:

$$Y' = 0.84 \cdot G + 0.16 \cdot B \qquad (6)$$

where G and B re the green and blue color values, respectively of the image in a red-green-blue color space, as described above. In this color representation the pupil is usually dark, while skin and sclera remain bright. So, in Y' representation the pupil is always dark against a bright background. Additionally, the red-eye occurring in the pupils can be used to facilitate the identification process, by utilizing another artificial color space defined by:

$$R_1 = R - 1.5 \cdot G \qquad (7)$$

where R and G are the red and green color values, respectively of the image in a red-green-blue color space, as described above. In this color representation, the lighter colors of the skin and sclera usually get associated with negative values (i.e., become darker), while darker colors, such as in the iris and pupil, are associated with positive values (become lighter). In particular, the color space defined by equation (7) results in red colors being associated with strongly positive values (lightest color). As a result, the $R_1$ representation of the pupils is typically bright against a dark background, facilitating identification of the location of the eyes.

In addition, since the color of the sclera is generally distinct on a face, the sclera can also be used to facilitate identification of eyes in a face. For example, color space transformation defined by:

$$W = Y \cdot (512 - 9(|Cb - 128| + |Cr - 128|)) \cdot (256 - 3 \cdot |Cb - Cr|)/2^{17} \qquad (8)$$

where Y is the luminance (brightness) component and Cb and Cr are the chrominance (color) components for the color values in the image in a YCbCr colorspace. In this color representation, all features of the face are generally associated with relatively low or negative values, while white or lighter pixels, such as in the sclera, are associated with relatively high or positive values.

Accordingly, based on these different color space conversions, the eye detection can be enhanced. For example, using the Y' representation, an eye detection algorithm can be configured to detect the dark circle in Y' image, which is assumed to be associated with the pupil and the iris, by convolving the gradient components in the Y' representation. Additionally, the eye detection algorithm can utilize the bright blob in $R_1$ image to detect the pupil versus the iris, especially if the pupil is red. This can be performed by averaging the $R_1$ image with rectangular kernels that have the expected size of the pupil. The eye detection algorithm can be further enhanced by utilizing the W representation of the image to locate the oval shape associated with an eye. For example, a sclera around and iris can be detected by convolving the W image with the rectangular kernels associated with the pupil/iris regions and the adjacent sclera regions. In some embodiments, the glint in the eyes can also be detected. For example, the Y' representation of the image can be analyzed to detect spikes in the image. The spikes can be found by making a map of the absolute gradient size ($|\partial_x|+|\partial_y|$) with averaging filter. However, the invention is not limited in this regard and various other methods of eye detection not listed above or different combinations of the methods listed above can be used with the various embodiments of the invention.

In some embodiments, the eye detection can proceed via a combination of the different representation described above by generating a function described by the multiplication:

$$M(x, y) = LM(x, y) \cdot \prod_{i=1}^{n} [a_i + b_i \cdot m_i(x, y)] \quad (9)$$

where $LM(x,y)$ is a piecewise linear function describing an expected location of the eye (based on statistical data), n is the number of representations being combined ($n \geq 1$), and $m_i(x, y)$ is the correlation coefficient or parameter for the $i^{th}$ representation. In equation (9), the parameters as and $b_i$ for a representation are trained to reduce and/or eliminate errors during eye detection. As noted above, $n \geq 1$. That is, for $M(x, y)$ at least the Y' representation can be used for eye detection. When multiplying, the scale of each term is not significant. In this way the detection process is robust to changes in illumination (which effect the response of part of the filters), or image blur (which effect another part), or other factors. The use of a pre-defined $LM(x,y)$ expresses the fact that the location of eyes in a face is generally certain. $LM(x,y)$ is generally expressed as the combination of piecewise linear function $LM_x(x)*LM_y(y)$, where both $LM_x$ and $LM_y$ are piecewise linear functions having a peak value that matches the statistical mean location of the right and left eyes, respectively, in faces in a database.

Using equation (9), the actual location of the two eyes can be given by the following expressions:

$$(x_1, y_1) = \arg\max \{M(x,y) | \text{all } (x,y) \text{ in top half of face}\} \quad (10)$$

and $$(x_2, y_2) = \arg\max \{M(x,y) | \Delta x_{min} \leq |x-x_1| \leq \Delta x_{max}, |y-y_1| \leq A_{max} * |x-x_1|\} \quad (11)$$

where arg max is argument of the maximum. That is, the value of the given argument for which the value of the given expression attains its maximum value. Equation (10) is based on the assumption that in a given image of an upright face, it is not expected that eyes would be in the bottom half of the face. Equation (11) is based on the assumption that is a minimal ($x_{min}$) and a maximal ($x_{max}$) distance generally expected for the eyes on a horizontal axis. Furthermore, Equation (11) is further based on the assumption that there is a maximal tilt angle ($\theta$) for a line on the horizontal axis connecting the eyes. Thus, for any eyes located at $(x_1,y_1)$ and $(x_2,y_2)$ on a face, $\tan(\theta)=(y_2-y_1)/(x_2-x_1)$ and $y_2-y_1=(x_2-x_1)*\tan(\theta)=A$. The values of $x_{min}$, $x_{max}$, and $A_{max}$ can be selected based on statistics gathered from the locations of eyes in faces in a database.

In some embodiments of the invention, the complexity of the eye detection process can be reduced by performing the eye detection process on a smaller image and/or an image including a fewer number of pixels than the original image. For example, in some embodiments of the invention, the original image (or any portion thereof) can be downscaled to 100×100 pixels without generally degrading the quality of the detection.

While various embodiments of the invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

What is claimed is:

1. A method for reducing eye coloration artifacts in an image, comprising:
    detecting an eye in the image;
    determining a pupil color for the eye in the image and a skin color of skin in the image adjacent to the eye;
    identifying at least one region of artifact coloration in the eye in the image based on the pupil color and the skin color;
    modifying a coloration of the region to compensate for the artifact coloration wherein the modifying includes forming an image mask specifying an amount of color correction for at least pixels associated with the region; and
adjusting a coloration of at least the region based on the image mask.

2. The method of claim 1, wherein detecting the eye in the image comprises employing at least one among a face detection algorithm and an eye location algorithm.

3. The method of claim 1, wherein determining the pupil color and the skin color further comprises:
selecting a bounding area of the image including the eye and the skin adjacent to the eye; and
sampling pixels in the bounding area associated with a pupil of the eye in the image and the skin.

4. The method of claim 1, wherein determining the pupil color and the skin color further comprises:
selecting a bounding area of the image centered on the eye;
sampling pixels in a central area of the bounding area to determine the pupil color; and
sampling pixels along a peripheral area of the bounding are to determine the skin color.

5. The method of claim 1, wherein identifying the region of artifact coloration further comprises:
segmenting pixels associated with the eye in the image into pupil and non-pupil pixels based at least on the pupil color and the skin color.

6. The method of claim 1, wherein modifying the coloration of the region further comprises:
performing falsing classification on the identified region of artifact coloration to generate a falsing classifier; and
adjusting a coloration of at least the region based on at least the falsing classifier.

7. An image processing system, comprising:
a processing element that is arranged to receive an input image; and further arranged for: detecting an eye in the image;
determining a pupil color for the eye in the image and a skin color of skin in the image adjacent to the eye;
identifying at least one region of artifact coloration in the eye in the image based on the pupil color and the skin color;
modifying a coloration of the region to compensate for the artifact coloration, wherein the processing element modifies the coloration of the region based on forming an image mask specifying an amount of color correction for at least pixels associated with the region; and
adjusting a coloration of at least the region based on the image mask.

8. The system of claim 7, wherein the processing element employs at least one among a face detection algorithm and an eye location algorithm for detecting the eye in the image.

9. The system of claim 7, wherein the processing element determines the pupil color and the skin color based on selecting a bounding area of the image including the eye and the skin adjacent to the eye, and sampling pixels in the bounding area associated with a pupil of the eye in the image and the skin.

10. The system of claim 7, wherein the processing element determines the pupil color and the skin color based on selecting a bounding area of the image centered on the eye, sampling pixels in a central area of the bounding area to determine the pupil color, and sampling pixels along a peripheral area of the bounding are to determine the skin color.

11. The system of claim 7, wherein the processing element identifies the region of artifact coloration based on segmenting pixels associated with the eye in the image into pupil and non-pupil pixels based at least on the pupil color and the skin color.

12. The system of claim 7, wherein the processing element modifies the coloration of the region based on performing falsing classification on the identified region of artifact coloration to generate a falsing classifier and adjusting a coloration of at least the region based on at least the falsing classifier.

13. A processor readable non-volatile storage medium that stores one or more components that, when executed on an image processing system, enable actions for reducing coloration artifacts in an image of an eye, comprising:
determining a pupil color for the eye in the image and a skin color of skin in the image associated with the eye;
identifying at least one region of artifact coloration in the eye in the image based on the pupil color and the skin-color;
modifying a coloration of the region to compensate for the artifact coloration, wherein the modifying includes forming an image mask specifying an amount of color correction for at least pixels associated with the region; and
adjusting a coloration of at least the region based on the image mask.

14. The processor readable non-volatile storage medium of claim 13, wherein detecting the eye in the image comprises employing at least one among a face detection algorithm and an eye location algorithm.

15. The processor readable non-volatile storage medium of claim 13, wherein determining the pupil color and the skin color further comprises:
selecting a bounding area of the image including the eye and the skin adjacent to the eye; and
sampling pixels in the bounding area associated with a pupil of the eye in the image and the skin.

16. The processor readable non-volatile storage medium of claim 13, wherein determining the pupil color and the skin color further comprises:
selecting a bounding area of the image centered on the eye;
sampling pixels in a central area of the bounding area to determine the pupil color; and
sampling pixels along a peripheral area of the bounding are to determine the skin color.

17. The processor readable non-volatile storage medium of claim 13, wherein identifying the region of artifact coloration further comprises:
segmenting pixels associated with the eye in the image into pupil and non-pupil pixels based at least on the pupil color and the skin color.

18. The processor readable non-volatile storage medium of claim 13, wherein modifying the coloration of the region further comprises:
performing falsing classification on the identified region of artifact coloration to generate a falsing classifier; and
adjusting a coloration of at least the region based on at least the falsing classifier.

* * * * *